July 27, 1937.    F. L. GRIER    2,088,516
TALKING PICTURE APPARATUS
Filed Oct. 4, 1935    4 Sheets-Sheet 3
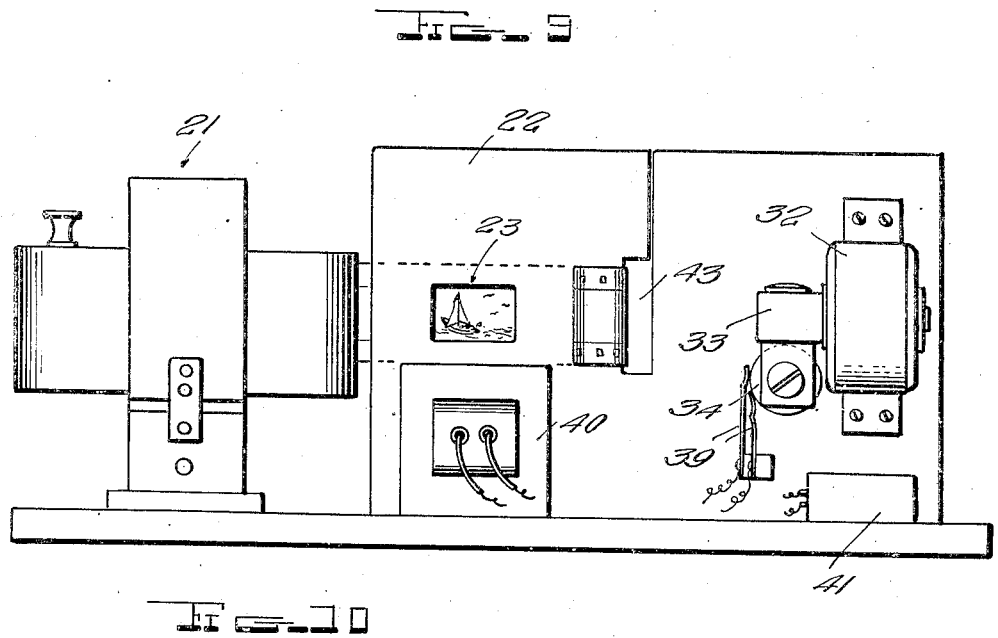
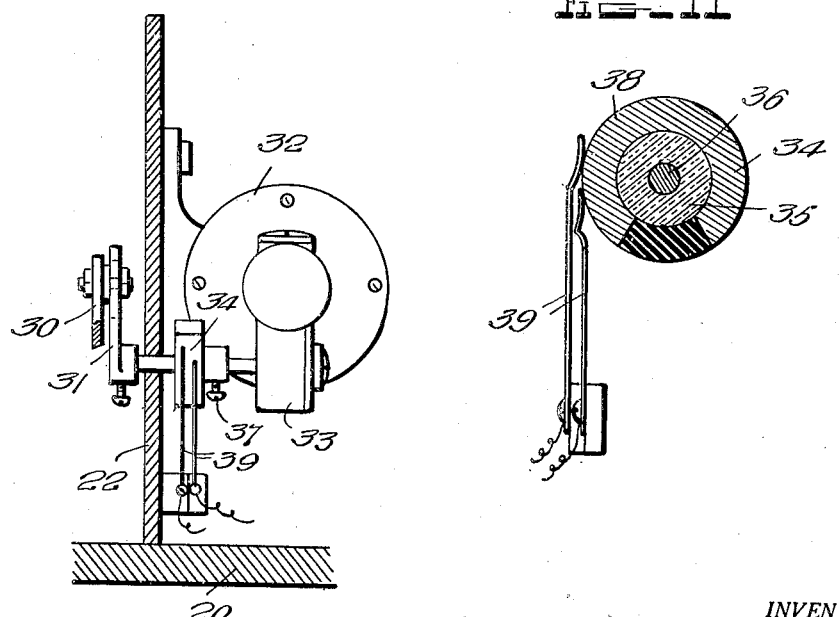
INVENTOR.
Frank L. Grier,
BY Donald L. Maxson.
ATTORNEY.

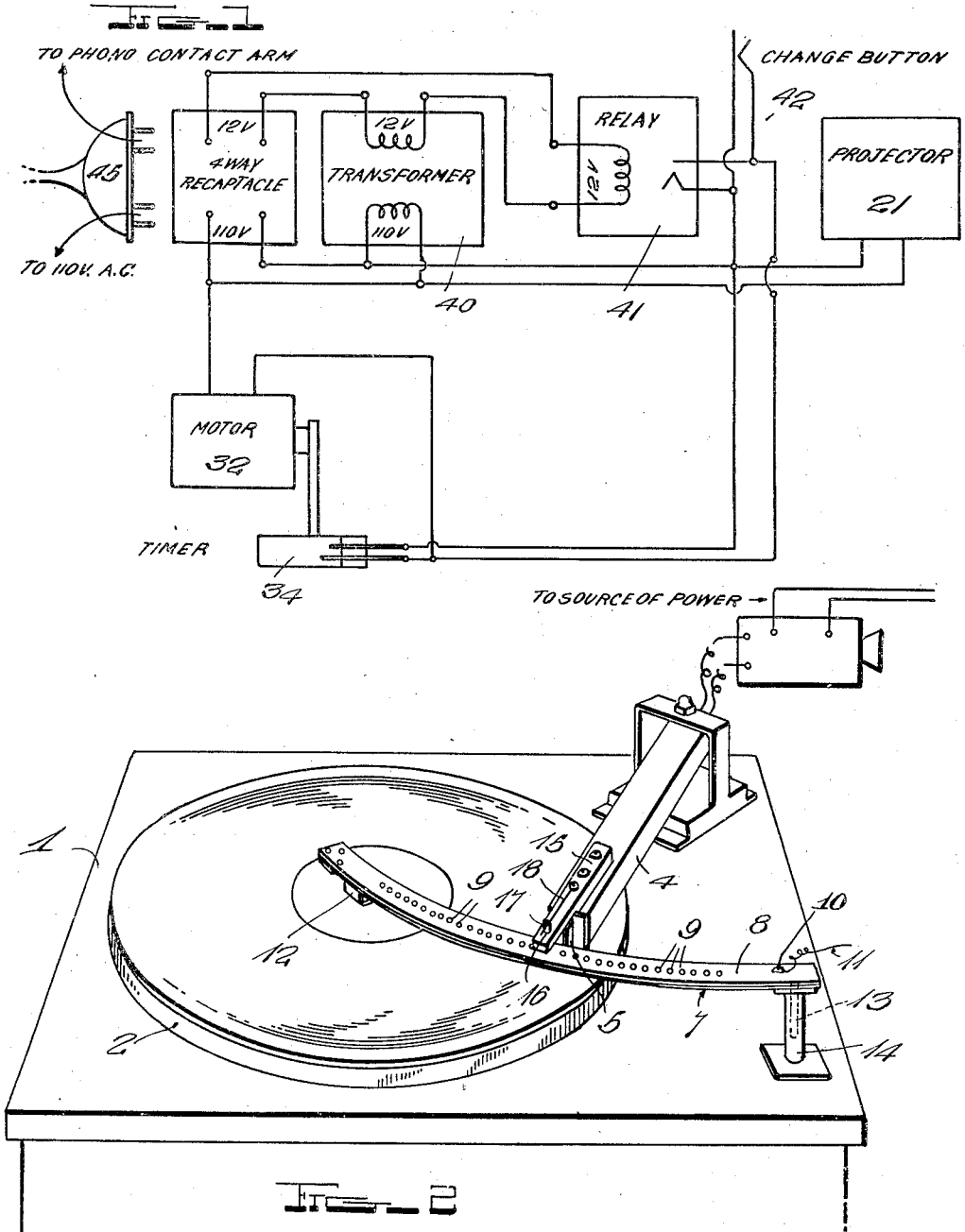

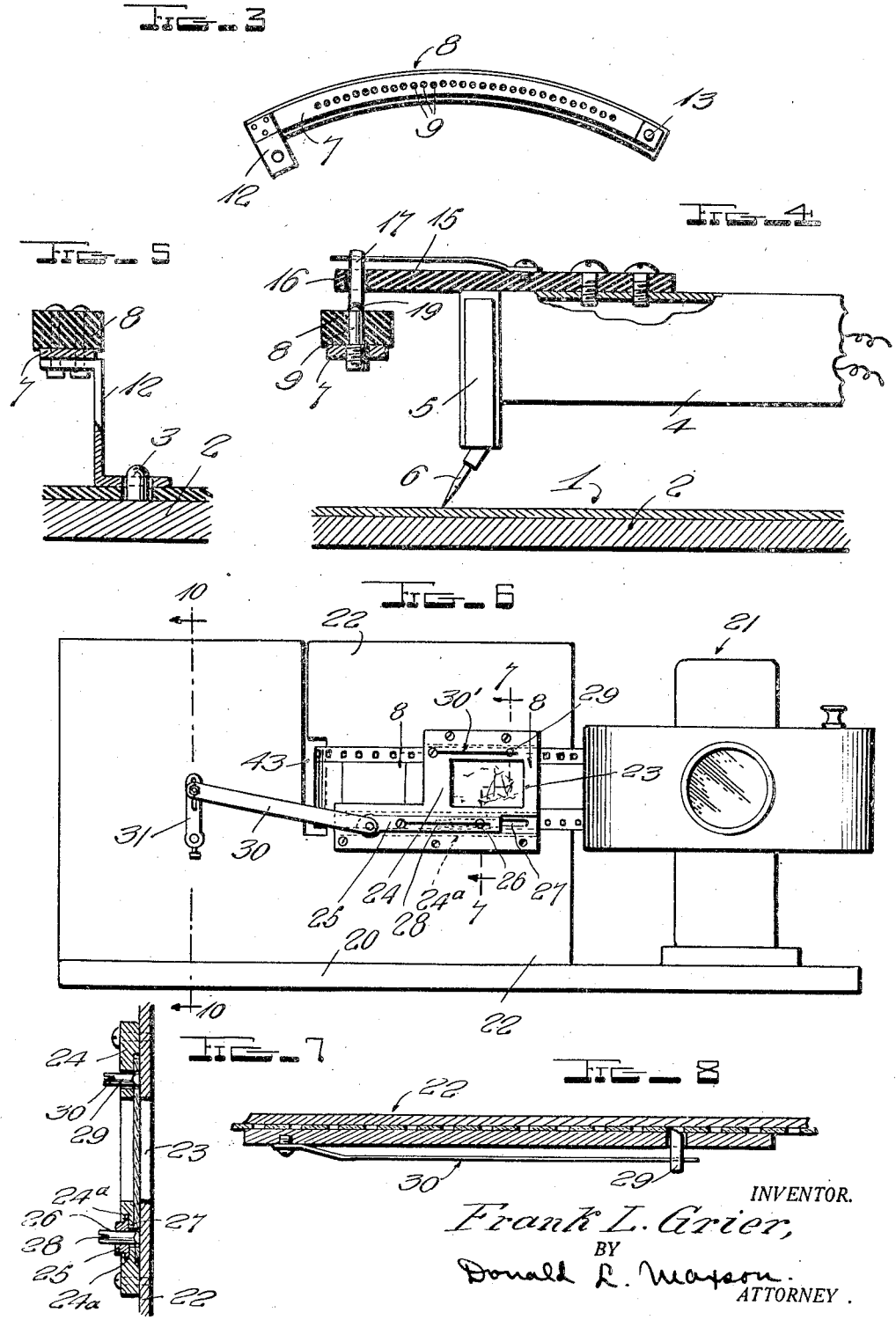

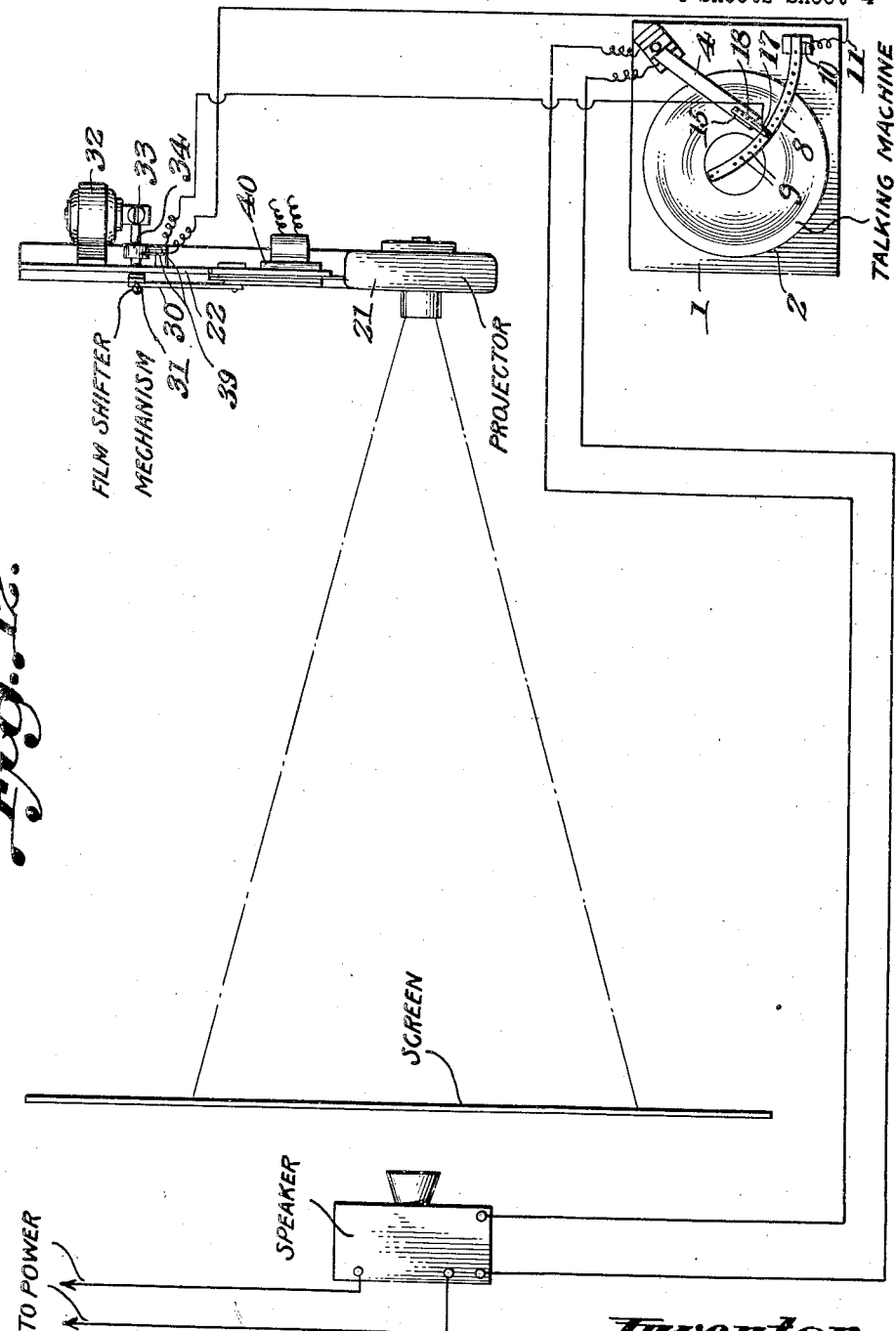

Patented July 27, 1937

2,088,516

UNITED STATES PATENT OFFICE 2,088,516

TALKING PICTURE APPARATUS

Frank L. Grier, Milford, Del.

Application October 4, 1935, Serial No. 43,582

3 Claims. (Cl. 88—28)

This invention relates to improvements in projectors designed to use photograph film or moving picture film, and used in connection with an amplifier and loud speaker mechanism in cooperation with a pick-up mechanism and associated phonograph, whose records contain appropriate subject matter relating to the pictures being projected, all of said apparatus being synchronously timed and automatic in operation.

An object of the invention is to provide an improved apparatus which will be capable of projecting film positives in combination with a film changing device therefor, said apparatus working in synchronism with a phonograph record, an amplifier and a loud speaker, with the pictures being timed as desired and arranged for continuous and automatic operation.

Another object of the invention is to provide a contact member or fixture in connection with a phonograph and pick-up mechanism which will be used with an amplifier and loud speaker, and a film projecting apparatus in which an electrically controlled film changing device is caused to be operated by the making of a closed circuit or contact between the contact member and the pick-up mechanism.

Other objects will appear as the description proceeds.

In the accompanying drawings which form a part of my application,

Figure 1 is a schematic diagram or arrangement of my improved hook-up;

Figure 2 is a perspective view of the sound pick-up mechanism used with a phonograph;

Figure 3 is a bottom view of the contact member or fixture;

Figure 4 is a side elevation partly in section of the contact member and cooperating circuit closing member;

Figure 5 is a sectional view through the contact member and inner support therefor;

Figure 6 is a front elevation of the projector and film shifting apparatus;

Figure 7 is a sectional view taken on the line 7—7 of Figure 6;

Figure 8 is a horizontal sectional view through the film shifting frame or member;

Figure 9 is a rear elevation of the projector and film shifting apparatus;

Figure 10 is a sectional view on the line 10—10 of Figure 6, and

Figure 11 is a partial sectional view of the timer mechanism.

Figure 12 is an assembled view of the complete apparatus.

Like characters of reference are used throughout the following specification and the accompanying drawings to designate corresponding parts.

In carrying out my invention, I provide any suitable phonograph 1 having the customary turntable 2, center pin 3, and sound arm 4 having a microphone 5 at its outer end provided with a sapphire or tungsten pointed pick-up needle 6. It is desired that phonograph will be equipped with a return mechanism for returning the sound arm to the outside of a record after the same has been played, and if desired, the phonograph also may be provided with a record changing mechanism, the operation of said mechanisms being automatic, or manually controlled.

The contact member or fixture comprises an arcuate strip of metal 7, having a similar shaped arcuate strip of bakelite 8 or any desired insulating material superimposed thereon and suitably fastened thereto. A plurality of contacts 9 are adapted to extend through the insulating strip 8 and to extend flush with the top thereof, and to be screwed or suitably fixed in the metal contact bar or strip 7, said contacts being arranged or positioned at regular and convenient intervals along the said contact member. Provision is made at 10 at the outer end of the bar or contact member for connecting an electrical conductor 11 with the other apparatus, later to be described. A supporting foot 12 is arranged at the inner end of the contact member and is adapted to seat over the center pin 3 of the phonograph while an outer supporting foot 13 is adapted to be received within a support 14 suitably affixed to the top of the phonograph.

A circuit closing member is carried by the sound arm 4, and cooperates with the contacts 9 on the contact member to effect the closing of a circuit to set into operation the film shifting mechanism, later to be described. The circuit closing member comprises a bar 15 suitably secured at the outer end of the sound arm 4, and is provided adjacent its outer end with the vertical opening 16, through which the contact pin 17 extends. The pin 17 is slotted at its upper end and receives a supporting wire spring 18, which is secured to the bar 15, as clearly illustrated in the drawings. The lower end of the pin 17 is somewhat beveled on two sides, and the resulting edge is somewhat rounded as at 19. It will be understood that the rounded edge of the pin 17 is adapted to wipe over the contacts 9 as the sound arm 4 moves inwardly over the record, as the same is being played.

The projector and film changing or shifting device will now be described. A supporting base 20 will support the projector 21 adjacent one end thereof, and may be any stock projector, so adapted that the positive film passes through horizontally, said film being moving picture film or roll film; in either event, the pictures may be arranged in the desired sequence with suitable perforations on the edges at proper intervals so that the film will line up with and be in proper position behind the lens.

A panel 22 will be secured to the base 20 in any suitable manner, and has an aperture 23 cut therein, about which the film guide is disposed. The film guide comprises a substantially rectangular shaped frame 24 which is screwed to the panel 22 about the aperture 23, and is at the same height as the film as it passes to and through the projector. The distance between the projector and the aperture in the panel is such that when a picture is in register with the aperture, there is a picture in place in the projector ready to be projected upon a suitable screen. The back of the frame is grooved sufficiently for the film to slide readily as it moves from the projector to the frame. An inverted T-shape groove 24a is cut in the bottom of the frame and is adapted to receive the slidable change bar 25, which is substantially T-shape in cross section, and which in turn carries the film engaging pin 26 extending through the elongated slot 27 in the frame 24, said pin 26 being slotted at its outer end to receive the supporting wire spring 28 fixed to the inner end of the bar 25. The inner end of the pin 26 is beveled towards the projector so that when the bar 25 moves towards the projector, the pin will not engage the perforations in the moving picture film directly below the pin, but when the bar 25 is moved in the opposite direction, the shoulder formed on the bottom of the pin will engage in one of the perforations in the film, and draw the film from position within the projector to position in the aperture in the panel, and draw the film one picture length thus bringing the next picture into position for projection. A second pin 29 is supported upon the wire spring 30' above the aperture 23, and extends through an opening in the upper side of the frame, and is beveled off in the same direction as the pin 26, and is disposed in a position to engage the perforations in the upper side of the film, and to engage the same when the bar 25 is moved towards the projector to prevent movement of the film while this movement of the bar is being effected. The change bar 25 is pivotally connected with the connecting rod 30, which in turn is connected to the crank 31 on the shaft of the electric motor 32 mounted behind the panel 22. The crank arm 31 is slotted for varying the throw of the crank as desired, and is intended to have a throw of approximately the length of the picture on the film. A speed reduction mechanism 33 will be carried by the motor 32, so that the complete rotation of the crank 31 is effected in approximately 2 to 2½ seconds.

Back of the panel and on the slow motor shaft 70 is mounted a timer 34. Since the duration of the contact pin 17 on the contacts carried by the contact bar can not be made a definite and uniform time, some means is necessary to insure a complete rotation of the slow motor shaft after being started by the contacting of the pin and contact bar. A small cylinder or wheel of insulating material 35 is secured to the motor shaft 36, by a set screw 37, so that the position of the wheel on the shaft may be changed as desired. On the wheel 35 is mounted a ring of metal 38 broken by an insulating segment, so set in that the periphery is smooth and unbroken. Bearing on the ring are two contact points 39 connected in parallel with the contact bar and the contact pin on the phonograph. The phonograph contact which lasts approximately two seconds, starts the motor, at which time the contact points of the timer are on the insulated segment. As the motor shaft revolves, the metal segment comes beneath the timer contact points and the motor contact thus maintained irrespective of the phonograph contact, until the shaft again brings the insulating segment beneath the timer contact points. The motor current is then broken and the motor stops, each time in the same position of the shaft and at a point which may be varied by changing the angular position of the timer with respect to the shaft.

Ordinarily the same voltage would be used on the contact arm on the phonograph and on the timer, as that necessary to operate the motor. However, 110 volts required to operate the motor used in such exposed places would be a source of danger, therefore, a small step down transformer 40 is included to furnish approximately 10 to 12 volts for the contact arm of the phonograph and the timer. The 110 volt current for the small electric motor is controlled by a suitable relay 41, operated by the 10-12 volt current. A switch 42 is provided for this unit so that the film may be changed at will to assist in adjustment, ascertain satisfactory operation, and obtain proper synchronization between the pictures and the phonograph disk or record.

A slot 43 is cut in the panel between the guide frame and the motor shaft and extends from the bottom of the film to the top of the panel so that the film is discharged to the rear as it travels through the changing unit.

In carrying out the invention, the pictures may be arranged in the desired order and sequence, and connected together, so that a continuous film may be utilized. It is desired that in the event different sized pictures are used, the film guide panel may be adjusted with respect to the projector to properly locate and center the films in the apparatus.

The mode of operation is as follows: The desired length of film is fed into the projector and into the film changing apparatus, and the proper and desired record placed upon the phonograph, at which time the circuit from the 110 volt source of current will be closed through the four way plug 45, the 110 volt current being led to motor 32, the timer 34, the projector 21, primary of step down transformer 40, relay 41, and control switch 42, while the 10-12 volt current from the secondary of the transformer 40 is connected with the relay 41, and through the pair of wires in the plug 45 to the contact member having the contacts 9 and to the contact pin 17. It will be apparent that a picture will be projected upon a suitable screen, and at the same time the phonograph will be giving a detailed description of the picture through the microphone of the phonograph and through a loud speaker connected thereto. When the contact pin 17 engages and contacts the second or next adjacent pin towards the center of the contact member, the motor 32 will again be started and kept running until it has rotated the crank arm connected therewith one full revolution, during which time the film changer will have pulled the next picture into position in the projector, and the record on the phonograph will then describe the second picture, and so on, until the end of the film strip and record, or in the event several records and films are used, until the projection of the pictures and the description is completed.

Many minor changes in detail of construction may be resorted to without departure from the spirit of the invention.

Having thus described my invention what I claim as new and desire to secure by Letters Patent of the United States is:

1. In a picture exhibitor, the combination with a disk phonograph with a sound pick up device and a film projector, said projector having a film guide and projection aperture and means to feed the film through the guide past the aperture, said means comprising a film feed bar, means to mount the bar for reciprocation, resiliently mounted means on said bar for engaging the film to advance the same when moved in one direction, separate means resiliently mounted on the guide for preventing movement of the film when the bar is moved in the opposite direction, a motor connected to the bar for reciprocating the same, a member carrying a plurality of electrical contacts spaced a predetermined distance from one another on the phonograph on which the said pick up device moves, a switch on the motor to provide one complete film movement, means on the pick up device to engage the spaced contacts, and means connecting the motor, motor switch, contacts, and contact engaging device in series.

2. In a picture exhibitor, the combination with a disk phonograph with a sound pick up device and reproducer, and a film projector, said projector having an intermittent film feed, a motor to drive the feed, a switch to operate the motor to provide one complete film movement comprising an insulated timer wheel driven by the motor, contact members engaging said timer wheel, means operated by the sound pick up device to close a circuit at predetermined intervals, and means interconnecting the motor, contact members, and said means operated by the said pick up device.

3. In a picture exhibitor having a film guide and projection aperture, means to feed the film intermittently past the aperture comprising a film feed bar, means to mount the bar for reciprocation, resiliently mounted means on said bar for engaging the film to advance the same when moved in one direction, separate means resiliently mounted on the guide for preventing movement of the film when the bar is moved in the opposite direction, a motor connected to the bar for reciprocating the same, and a switch in the motor circuit for operating the motor to provide one complete film movement.

FRANK L. GRIER.